US011339779B2

(12) United States Patent
Fowler et al.

(10) Patent No.: US 11,339,779 B2
(45) Date of Patent: May 24, 2022

(54) CONTAINING FLUID LEAKS ON ADDITIVE PUMPS

(71) Applicant: Natural Gas Solutions North America, LLC, Houston, TX (US)

(72) Inventors: Robert Erling Fowler, Houston, TX (US); Ramesh Konduri, Houston, TX (US); Matthew Walter Schoppe, Magnolia, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 279 days.

(21) Appl. No.: 15/717,505

(22) Filed: Sep. 27, 2017

(65) Prior Publication Data
US 2019/0093653 A1 Mar. 28, 2019

(51) Int. Cl.
| F04B 53/16 | (2006.01) |
| F04B 53/14 | (2006.01) |
| F16J 15/3268 | (2016.01) |
| F04B 19/22 | (2006.01) |

(52) U.S. Cl.
CPC .............. *F04B 53/16* (2013.01); *F04B 19/22* (2013.01); *F04B 53/143* (2013.01); *F04B 53/164* (2013.01); *F04B 53/166* (2013.01); *F16J 15/3268* (2013.01)

(58) Field of Classification Search
CPC .... F04B 53/143; F04B 53/164; F04B 53/166; F04B 53/3268; F04B 1/0448; F04B 19/22; F04B 53/16; F16J 15/322; F16J 15/3252; F16J 15/3268
USPC .............................. 92/165 R, 171.1; 285/351
See application file for complete search history.

(56) References Cited

U.S. PATENT DOCUMENTS

| 4,071,254 | A | 1/1978 | Raimondi et al. |
| 5,674,055 | A | 10/1997 | Nimberger et al. |
| 6,045,137 | A | 4/2000 | Friend et al. |
| 6,422,569 | B1 | 7/2002 | Comes et al. |
| 6,616,146 | B2 | 9/2003 | Friend et al. |
| 7,988,156 | B2 | 8/2011 | Morrison |

(Continued)

FOREIGN PATENT DOCUMENTS

| CA | 2591186 A1 | 12/2007 |
| CN | 105257618 A | 1/2016 |

(Continued)

OTHER PUBLICATIONS

Extended European Search Report (EESR) dated Feb. 15, 2019, in corresponding EP18194477.8.

*Primary Examiner* — Kenneth J Hansen
(74) *Attorney, Agent, or Firm* — Paul Frank + Collins P.C.

(57) ABSTRACT

A sealed connection device configured to connect a pump head with a pump on an additive pump. The sealed connection device may comprise an adapter and a sealing collar that inserts into the adapter. The sealing collar may comprise a body with a bore forming open ends, a shoulder disposed between the open ends, an annular detent adjacent the shoulder, annular grooves, one being disposed on the shoulder two others found on either side of the shoulder, and o-rings disposed in the annular grooves. The pump may couple with a first side of the adapter, the pump comprising a shaft that inserts in the bore of the sealing collar. The pump head may insert into a second side of the adapter so as to contact one of o-rings on the sealing collar.

16 Claims, 8 Drawing Sheets

(56) References Cited

U.S. PATENT DOCUMENTS

| | | |
|---|---|---|
| 9,341,175 B2 | 5/2016 | Ramos |
| 9,605,672 B2 | 3/2017 | Harvey et al. |
| 2004/0056424 A1 | 3/2004 | Busse et al. |
| 2004/0206229 A1* | 10/2004 | Morrison ................ F01L 25/02 91/348 |
| 2004/0227301 A1 | 11/2004 | Wood et al. |
| 2005/0087935 A1 | 4/2005 | Hughes |
| 2007/0283806 A1 | 12/2007 | Morrison |
| 2010/0253007 A1* | 10/2010 | Tackett ................... F04B 15/04 277/513 |

FOREIGN PATENT DOCUMENTS

| | | | |
|---|---|---|---|
| CN | 105927739 | A | 9/2016 |
| DE | 202007018684 | U1 | 2/2009 |
| EP | 1273835 | A2 | 8/2003 |
| GB | 836509 | A | 6/1960 |
| GB | 1407874 | | 10/1975 |
| WO | 2015120946 | A1 | 8/2015 |

* cited by examiner

CONTAINING FLUID LEAKS ON ADDITIVE PUMPS

BACKGROUND

Additive pumps enjoy wide use in heavy industries. These devices are known to incorporate into larger injection stations that couple with conduit (e.g., pipes, pipelines, etc.), for example, as part of oil & gas extraction and distribution networks. The injection station is meant to provide substances (e.g., chemicals, lubricants, etc.) into fluid that transits the conduit. Some of these substances (or "additives") may pose a hazard to areas that surrounds the injection area. It follows, then, that precautions are necessary to contain the additives to avoid leaks or spills from the injection stations and its piece parts, including the additive pump.

SUMMARY

The subject matter disclosed herein relates to improvements in additive pumps to address these concerns. Of particular interest are embodiments that prevent leaks of additive from around a shaft that, nominally, reciprocates to accurately disperse fluid from a pump head, but the concepts may find use with rotating shafts as well. The embodiments can include an adapter that interposes between the pump and the pump head. A collar with a pair of radial seals, typically face seals or lip seals, may reside in the adapter. This collar is configured to contain additive that migrates past, for example, one of the radial seal. A drain may allow the additive to re-circulate back into operative plumbing of the pump station, thus avoiding leaks that could potentially contaminate areas around the injection station.

DRAWINGS

Reference is now made briefly to the accompanying drawings, in which.

Figure 1:
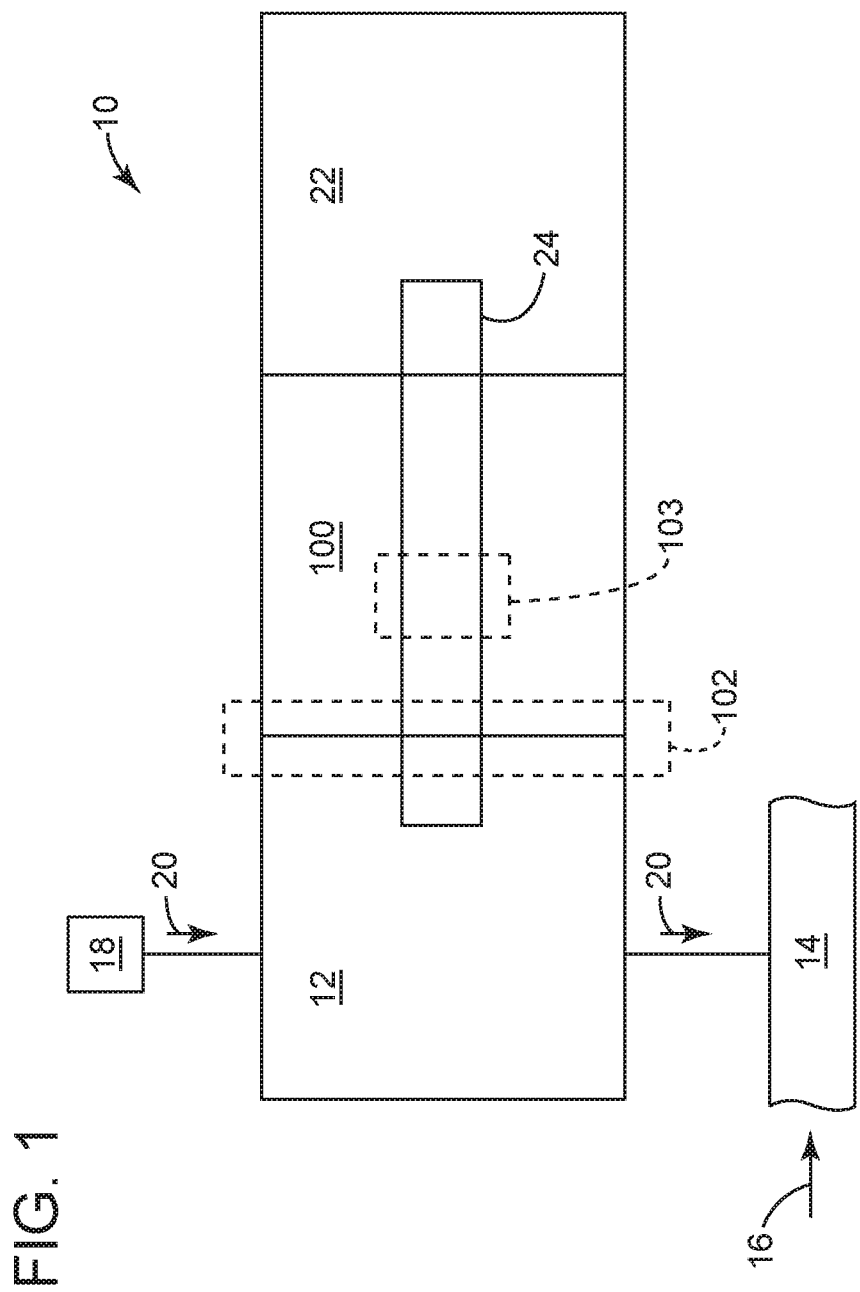
FIG. 1 depicts a schematic diagram of a sealed connection device as part of a pump.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion that follows describes embodiments of a device that connects a pump head with a pump. This arrangement is typical of construction found at an additive pump or pump station. But it's possible that the concepts could translate to other types of devices that are in need of similar features as well. In this regard, the device uses a two-piece design. A first piece connects the pump head with the pump. A second piece inserts into the first piece. This second piece is configured to extend into the pump head, for example, outside of the first piece so as to position an o-ring (or like sealing member) in contact with the pump head. Other embodiments are within the scope of this disclosure.

FIG. 1 depicts, schematically, an exemplary embodiment of a sealed connection device 100. The embodiment is shown as part of a pump, identified generally by the numeral 10. Examples of the pump 10 may have a pump head 12 that couples with a conduit 14 that carries material 16. The pump head 12 may also couple with a supply 18 that provides an additive 20. The pump 10 may include a motive unit 22, possibly an electric motor or a pneumatic cylinder. A shaft 24 may couple with the motive unit 22. The shaft 24 may extend through the sealed connection device 100 to locate its end proximate the pump head 12. In operation, the motive unit 22 moves the shaft 24 to operate the pump head 12 to disperse the additive 20 into the conduit 14. The sealed connection device 100 may form a sealed interface 102 with the pump head 12. On its inside, the sealed connection device 100 may form a sealed region 103 to contain leaks of additive 20 that may migrate down the shaft 24 (toward the motive unit 22).

Broadly, the sealed connection device 100 may simplify construction of the pump 10. To date, practice in the field prescribes devices with multiple pieces to support and seal reciprocating shafts in additive pumps. The sealed interface 102 and sealed region 103 are constructed to offer a unique solution that replaces these pieces with a single, robust member. This feature may effectively reduce manufacturing costs and, at the same time, prolong operating life of the seals.

Figure 2:
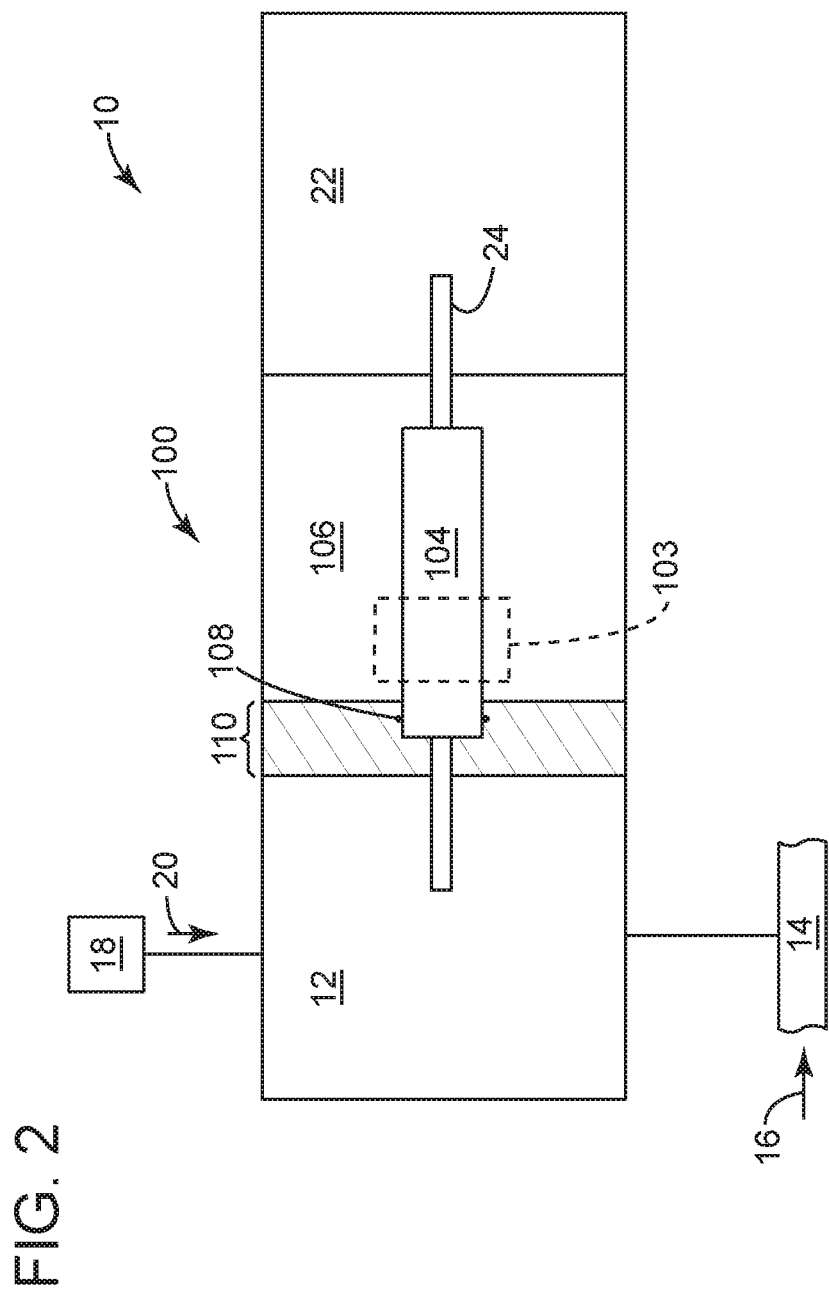
FIG. 2 depicts a schematic diagram of the sealed connection device of FIG. 1.

FIG. 2 depicts a schematic diagram of an example of structure for the sealed connection device 100 of FIG. 1 to facilitate the sealed interface 102. This structure includes a sealed collar 104 that resides in an adapter 106 that is useful to couple the pump head 12 to the motive unit 22. The sealed collar 104 can receive and support the shaft 24 as it reciprocates under load from the motive unit 22. At the sealed interface 102, the sealed collar 104 extends into the pump head 12. The adapter 106 may also receive part of the pump head 12 to form an overlapping region 110, where structure of these components mesh or mate with one another. This configuration forms a direct seal 108 between sealed collar 104 and the pump head 12.

Figure 3:
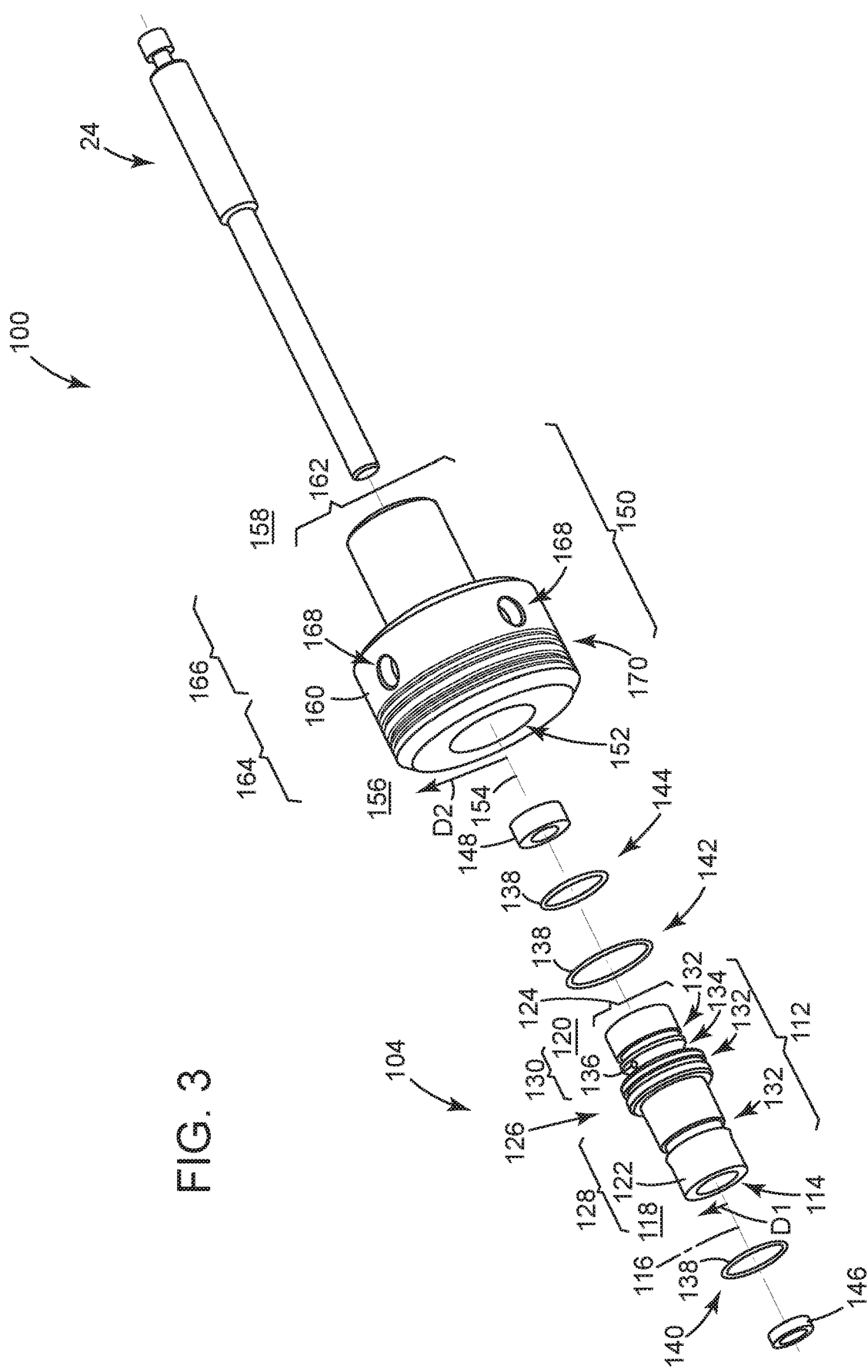
FIG. 3 depicts a perspective view of exemplary structure for the sealed connection device of FIG. 1 in exploded form.

FIG. 3 depicts a perspective view of exemplary structure for the sealed connection device 100 in exploded form. Starting on the left-hand side of the diagram, the sealing collar 104 may have a collar body 112, shown here as an elongate cylinder or with cylindrical form factor that can be fashioned as a single piece of material or, otherwise, of unitary or monolithic design. The collar body 112 may have a through-bore 114 that forms a longitudinal axis 116 and a pair of open ends (e.g., a first open end 118 and a second open end 120). The collar body 112 may also have an outer surface 122 with a stepped profile 124 defined by a dimension $D_1$ (, for example, a diameter for cylinders or annular pieces,) as measured from the longitudinal axis 116. In one implementation, the stepped profile 124 may form at least one shoulder 126 that separates the outer surface 122 into two regions (e.g., a first region 128 and a second region 130). The diameter $D_1$ in the regions 128, 130 is smaller than the diameter $D_1$ at the shoulder 126. Grooves 132 that circumscribe the longitudinal axis 116 may populate the outer surface 122 of the collar body 116, including at the shoulder 126 and in the regions 128, 130. In addition, the collar body 116 may include an annular detent 134, shown here in the second region 130 and adjacent the shoulder 126. One or more apertures 136 may reside in the annular detent 134. The apertures 136 may be spaced annularly apart from one another about the longitudinal axis 116.

The sealing collar 104 may be configured with one or more components so that fluid cannot migrate out of the device. These components may include annular seals 138 like elastomeric o-rings (e.g., a first o-ring 140, a second o-ring 142, and a third o-ring 144). On either end 118, 120, the collar body 112 may accommodate radial seals (e.g., a first radial seal 146 and a second radial seal 148). The o-rings 140, 142, 144 may assemble into the grooves 132 so as to circumscribe the collar body 112. Examples of the radials seals 146, 148 may engage with the shaft 24 but allow for moveable contact so that the shaft 24 can reciprocate (or rotate) along the longitudinal axis 116 as noted herein.

The adapter 106 may be configured to receive the sealing collar 104. This configuration may have an adapter body 150. This piece may also be fashioned unitarily with a cylindrical form factor. The adapter body 150 may have a through-bore 152 that forms a longitudinal axis 154 and open ends (e.g., a first open end 156 and a second open end 158). Its outer surface 160 has a stepped profile 162 featuring two sections (e.g., a distal section 164 and a proximal section 166) defined by a dimension $D_2$ (also a diameter for purposes of the cylindrical form factor) as measured from the longitudinal axis 154. In one implementation, the diameter $D_2$ of the distal section 164 is larger than the diameter $D_2$ of the proximal section 166. Apertures 168 and grooves 170 may populate the distal section 164.

Figure 4:
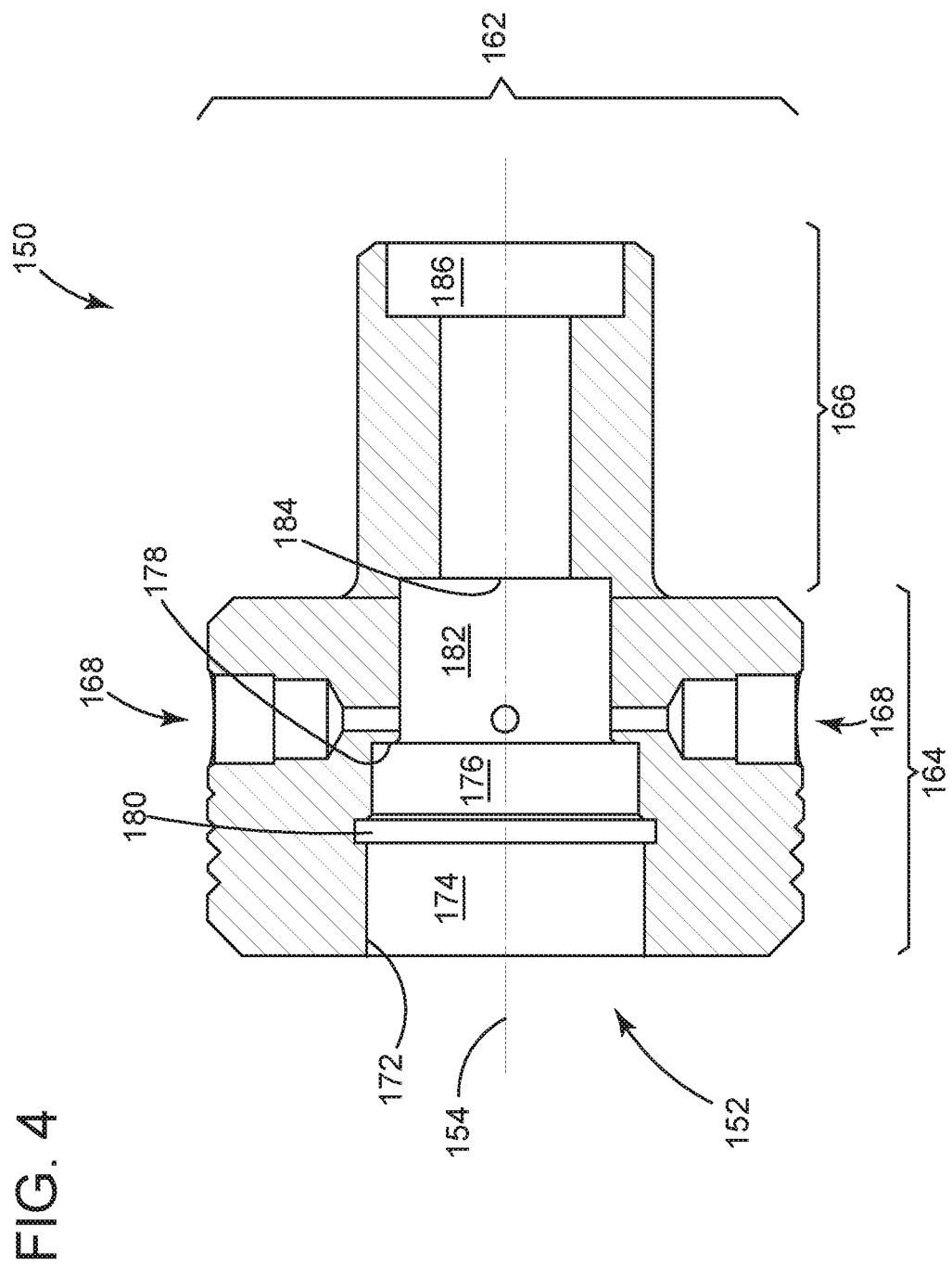
FIG. 4 depicts an elevation view of the side, cross-section of part of the structure for the sealed connection device of FIG. 3.

FIG. 4 depicts an elevation view of the cross-section of the side of the adapter body 150 of FIG. 3. The through-bore 152 may have a stepped inner surface 172 typical of variations in diameter along the longitudinal axis 154. These variations may define a pair of distal counterbores (e.g., a first counterbore 174 and a second counterbore 176) that terminate at a first landing surface 178. An interior thread relief 180 may interpose between the counterbores 174, 176. The inner surface 172 may also include a third or medial counterbore 182 of smaller diameter (than the counterbores 174, 176). The third counterbore 182 may extend from the landing surface 178 to a second landing surface 184. The stepped inner surface 172 may terminate at a fourth or proximal counterbore 186 at the end of the adapter body 156 in the proximal section 166. As also shown, the apertures 168 may be configured to extend through the material of the adapter body 150 to the through-bore 152. These configurations may have a multi-diameter profile that reduces in size from the outer surface 160 toward the through-bore 152.

Figure 5:
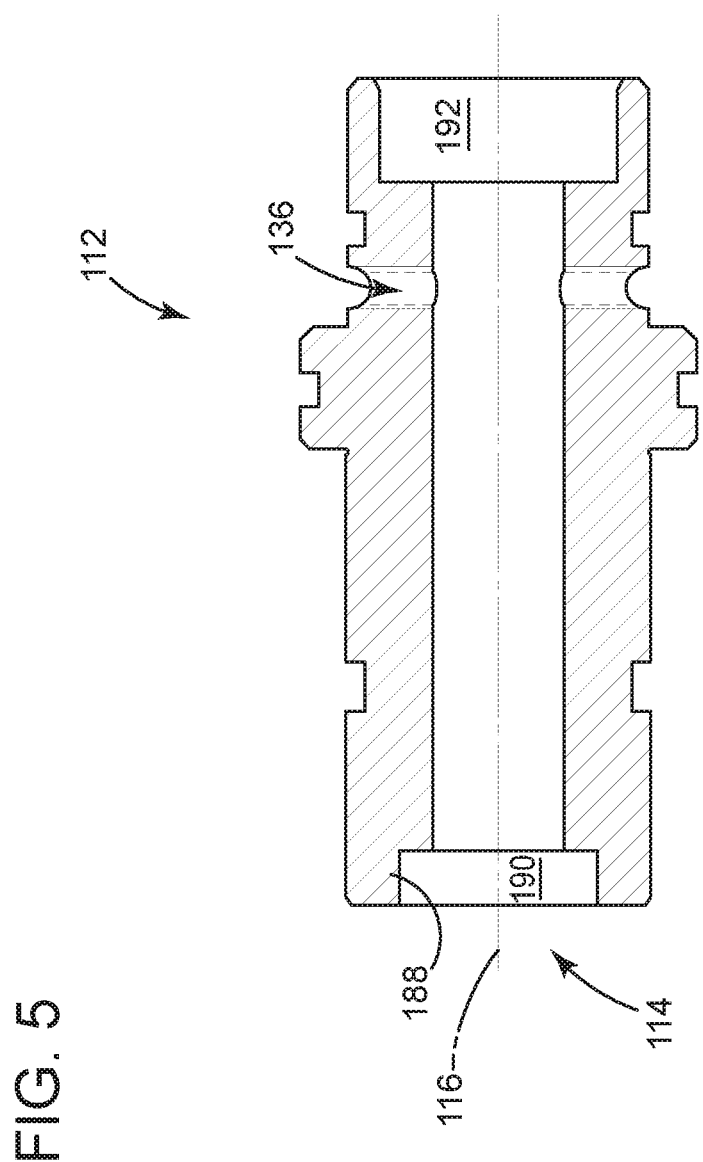
FIG. 5 depicts an elevation view of the side, cross-section of part of the structure for the sealed connection device of FIG. 3.

FIG. 5 depicts an elevation view of the cross-section from the side of the collar body 112 of FIG. 3. The through-bore 114 may have a stepped inner surface 188 of varying diameter along the longitudinal axis 116. This variable diameter may define a pair of counterbores (e.g., a first counterbore 190 and a second counterbore 192) at the ends 132, 134. As also shown, the apertures 136 may penetrate the material of the collar body 112 to allow access to the through-bore 114.

Figure 6:
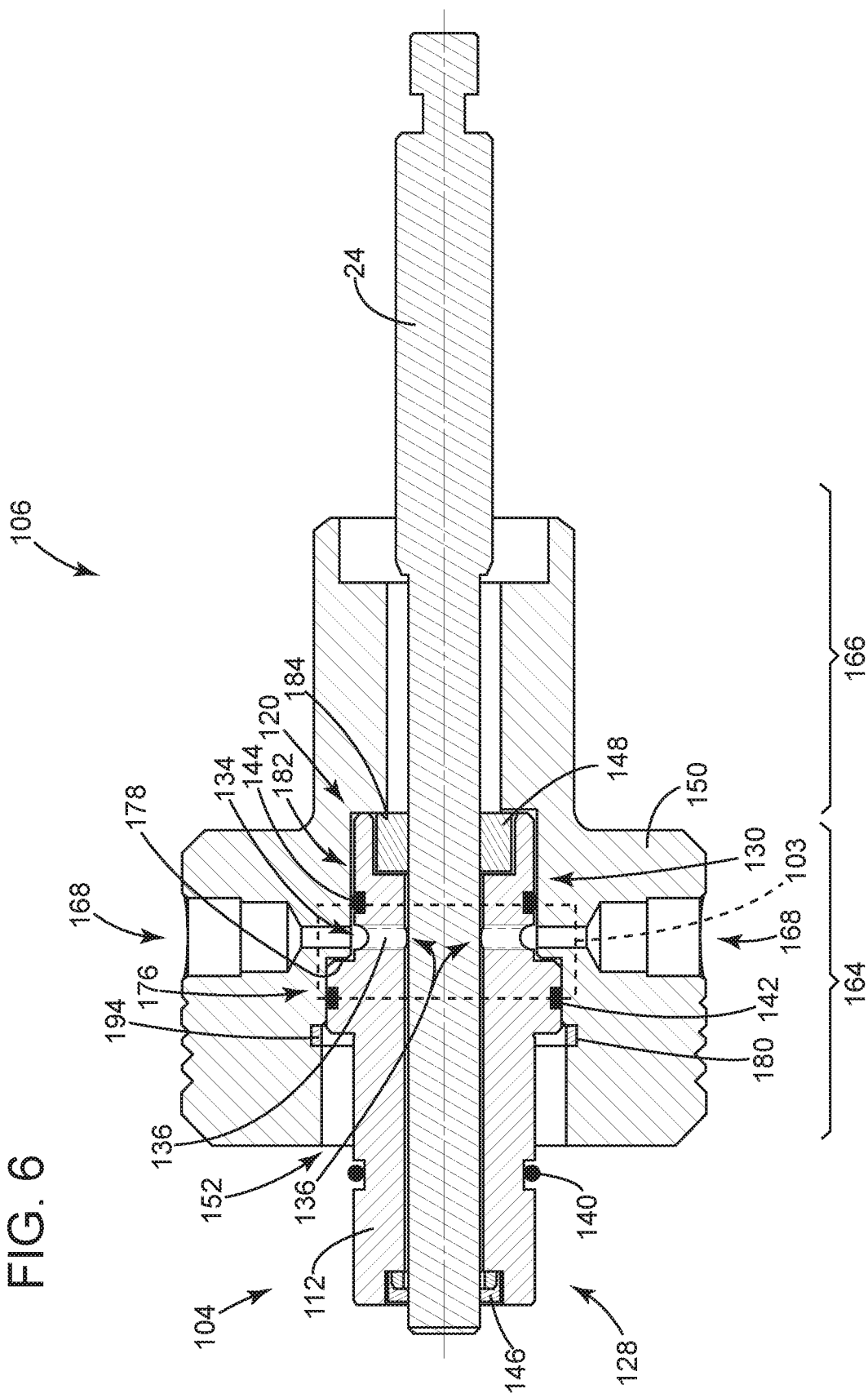
FIG. 6 depicts an elevation view of the side, cross-section of the sealed connection device of FIG. 3 in assembled form.

FIG. 6 shows an elevation view of the side, cross-section of the sealed connection device of FIG. 3 in assembled form. The sealing collar 104 inserts into the through-bore 152 of the adapter body 150. Contact between the end 120 and the second landing surface 184 may set the appropriate position of the collar body 112 in the adapter body 150. When assembled, part of the first region 128 of the collar body 112 may reside outside of the distal section 164 of the adapter body 150. This configuration may locate the first o-ring 140 outside of the adapter body 150. The second region 130 of the collar body 112 resides extensibly in the distal section 164 of the adapter body 150. This location orients the annular detent 134 in longitudinal alignment with the apertures 168. The collar body 112 may orient so that the apertures 136 align with the apertures 168 as well, but this is not necessary for operation of the device. The location also places o-rings 142, 144 in contact with the adapter body 150 in the counterbores 176, 182. This feature creates the sealed region 103 with fluid barriers (e.g., the o-rings 142, 144) on either side of the annular detent 134. In use, additive that migrates into the through-bore 114 (for example, because the radial seal 146 fails,) can exit through the aperture 136 to the annular detent 134. The additive can flow from there to the apertures 168 in the annular body 150, which may couple with conduit to direct the additive back into the pump 10 (FIG. 1). The sealed region 103 prevents further migration from the adapter body 150.

Figure 7:
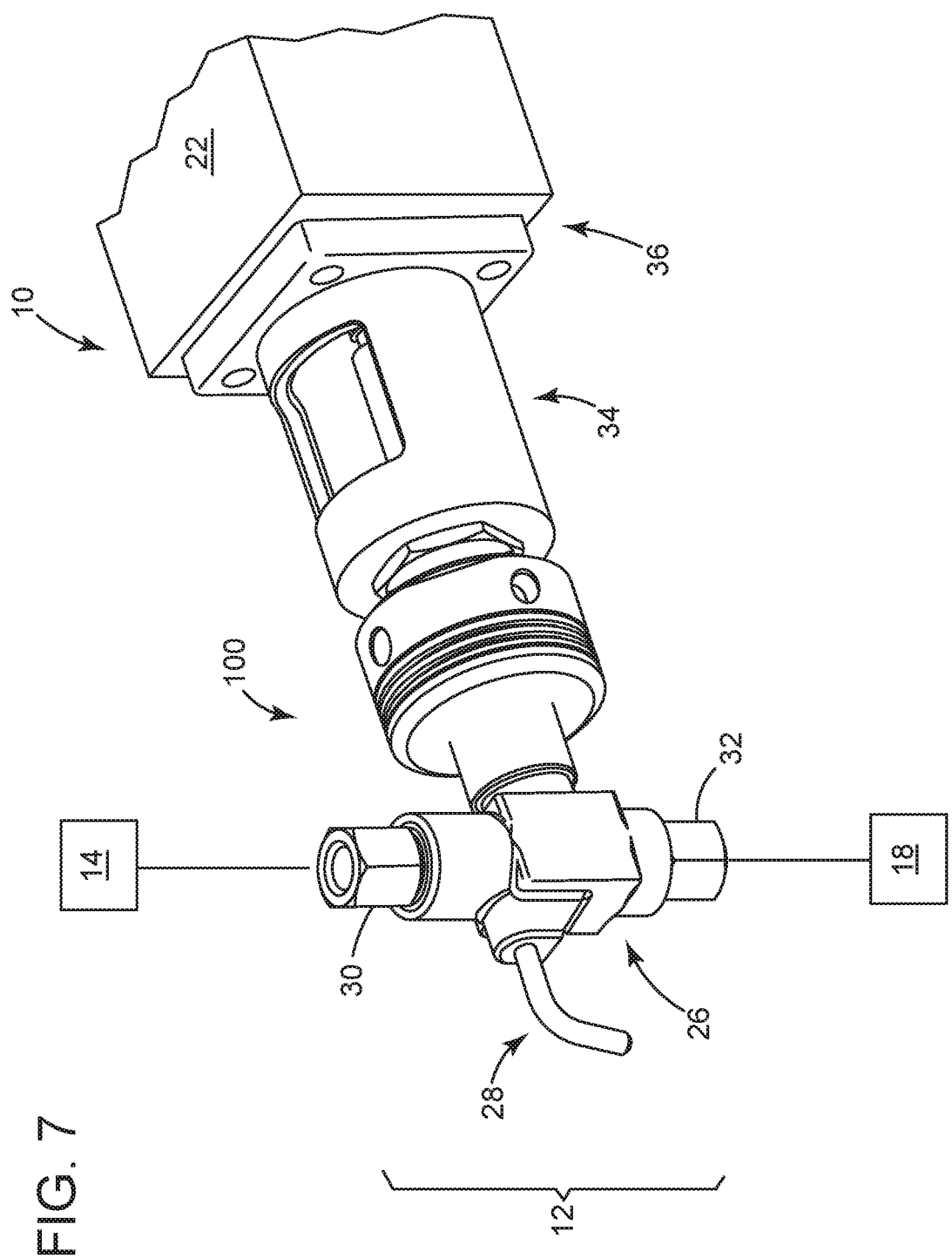
FIG. 7 depicts a perspective view of exemplary structure for the pump of FIG. 1 that includes the sealed connection device of FIG. 3.

FIG. 7 depicts a perspective view of exemplary structure for the pump 10 that includes the sealed connection device 100 of FIG. 3. The pump structure may utilize piece parts with appropriate fit and function. The concepts herein, however, may accommodate different variations of this structure because the pump 10 may operate across a wide range of applications that might nominally require changes, updates, and revisions in the design. In this regard, the pump head 12 may have pump body 26 with a valve stem 28 and a pair of connectors (e.g., a first connector 30 and a second connector 32) disposed thereon. The connectors 30, 32 may connect with the conduit 14 and the supply 18, respectively. The motive unit 22 may include a housing 34 that terminates at a mounting plate 36. As shown, the sealed connection device 100 may be configured to interpose between the pump body 26 and the housing 34. This configuration may operate as an option on these types of devices, for example, for use with additives that might be caustic or hazardous materials. The option may outfit the pump 10 to address environmental regulations or specifications that require "extra" containment measures to prevent leaks of these materials. To accommodate, the sealed connection device 100 may releasably engage with the body 26 and housing 34. Threaded connections may benefit the device for this purpose so as to allow the pump body 26 and the housing 34 to thread onto or into the adapter body 150.

Figure 8:
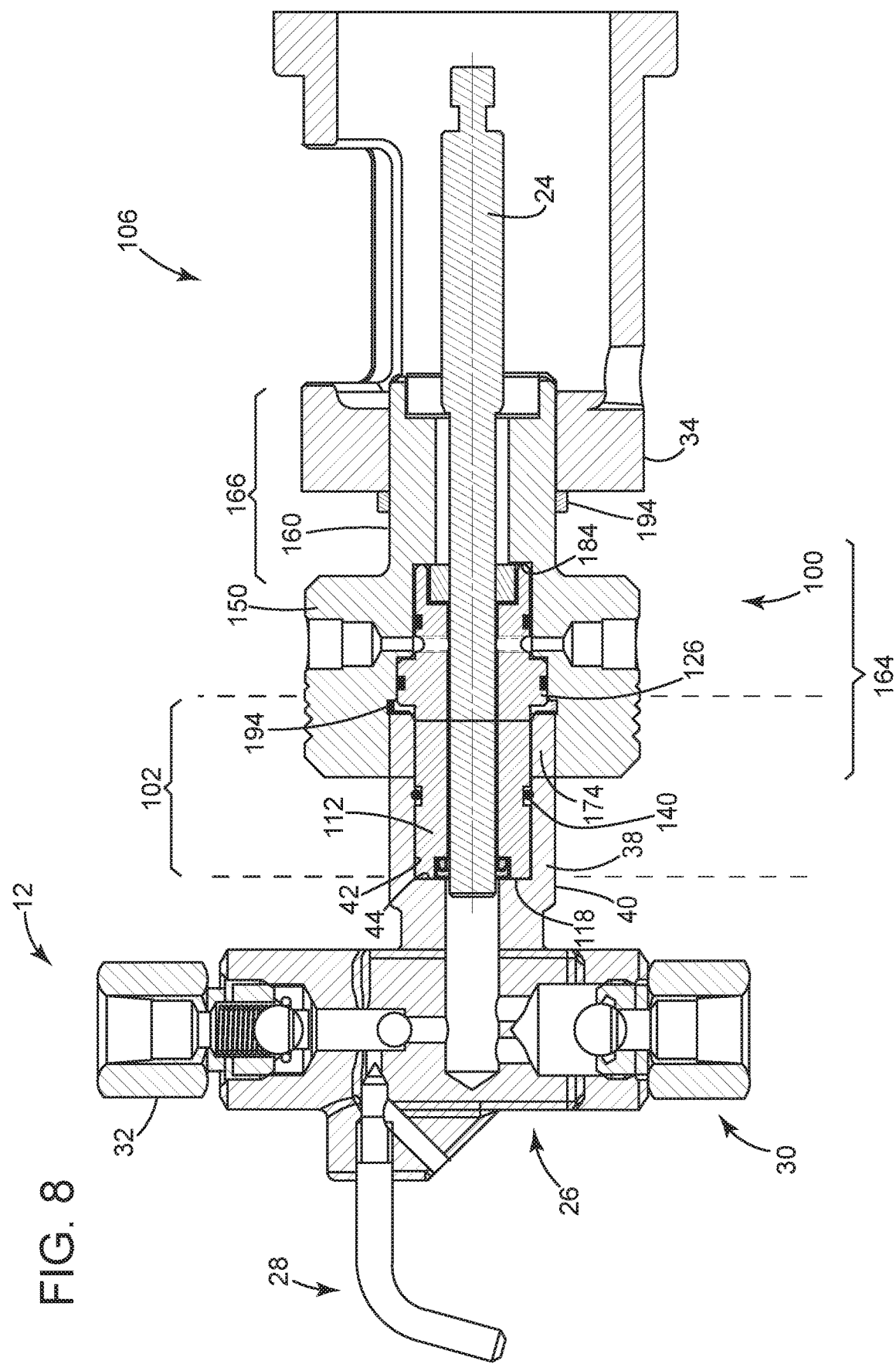
FIG. 8 depicts an elevation view of the side, cross-section of the pump of FIG. 7.

FIG. 8 depicts an elevation view of the side, cross-section of the pump 10 of FIG. 7 to discuss such configurations. The proximal section 166 of the adapter body 150 may insert into the housing 34. Corresponding threads on outer surface 160 may engage a threaded bore of the housing 34 may be useful for this purpose. A nut 194 may thread onto the proximal section 166 of the adapter body 150. When tightened against the housing 34, the nut 196 may operate to lock and prevent annular rotation of the adapter body 150 relative to the housing 34. At the pump head 12, the sealed interface 102 may receive a part 38 of the pump body 26 that inserts into the first counter bore 174 of the adapter body 150. The part 38 may have an outer surface 40 that is threaded to mate with complimentary threads of the first counter bore 174. On the inside, the part 38 may include a bore 42 that ends at a terminable face 44. Assembly of the device may require the part 38 to screw into the adapter body 150 so as to cause the end 118 of the collar body 112 to contact the terminable face 44. The threaded connection may cause a slight compressive loading to "squeeze" the collar body 112 between the terminable face 44 (on the first end 118) and the second landing surface 184 (on the second end 120). When assembled, the exposed portion of the collar body 112 resides inside of the part 38 of the pump body 10. This configuration places the first o-ring 140 in contact with the bore 42 of the part 38.

In light of the foregoing, the embodiments are useful to re-circulate additive from around the shaft in the elongate cylindrical body. This feature can contain the additive within the device (or, generally, the additive pump) to avoid leaks or spills so that the device aligns with environmental regulations or standards. Unlike conventional designs, though, the improvements herein simply construction. The elongate cylindrical body employs unitary construction to eliminate unnecessary additional parts. This construction also operates to seal directly with the pump head, which is nominally not found in prior designs.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. An additive pump, comprising:
    a sealed connection device comprising
        an adapter with a through bore having a longitudinal axis, the through bore terminating at a distal opening in a distal section and a proximal opening in a proximal section of the adapter, where the distal section of the adapter has an outer diameter that is larger than the outer diameter of the proximal section of the adapter as measured from the longitudinal axis, and
        a sealing collar that inserts into the distal opening of the distal section and at least partially resides in the through bore of the adapter, the sealing collar comprising a single, monolithic body with a bore forming open ends, a shoulder disposed between the open ends, an annular detent adjacent the shoulder, a plurality of annular grooves, with one annular groove of the plurality of annular grooves being disposed on the shoulder and two other of the annular grooves of the plurality of annular grooves located on either side of the shoulder, and o-rings disposed in each of the annular grooves;
    a pumping mechanism coupled with the proximal section of the adapter, the pumping mechanism comprising a shaft that inserts in the bore of the sealing collar; and
    a pump head inserted into the distal opening of the distal section of the adapter,
    wherein one of the o-rings resides wholly outside of the through bore and to one side of the distal opening of the distal section of the adapter and contacts the pump head.

2. The additive pump of claim 1, wherein two of the o-rings contact the adapter to form barriers of a sealed region on either side of the annular detent.

3. The additive pump of claim 1, wherein the body of the sealing collar extends out of the distal opening of the distal section of the adapter and into the pump head.

4. The additive pump of claim 1, wherein the adapter is threaded to engage with complimentary threads on the pumping mechanism.

5. The additive pump of claim 1, wherein the adapter is threaded to engage with the pump head.

6. The additive pump of claim 1, wherein the shaft extends through the body of the sealing collar from the pumping mechanism.

7. The additive pump of claim 1, further comprising:
    a nut coupled with the adapter, wherein the nut prevents annular rotation of the adapter relative to the housing.

8. The additive pump of claim 1, wherein the pumping mechanism comprises a motive unit that causes the shaft to reciprocate in the pump head.

9. The additive pump of claim 1, wherein the pumping mechanism comprises an electric motor.

10. The additive pump of claim 1, wherein the pumping mechanism comprises a pneumatic cylinder.

11. The additive pump of claim 1, further comprising:
    an aperture disposed in the annular detent.

12. The additive pump of claim 1, further comprising:
    one or more apertures that reside in the annular detent.

13. The additive pump of claim 1, wherein the annular detent is between the shoulder and one of the plurality of annular grooves.

14. The additive pump of claim 1, further comprising:
    apertures in the adapter that align with the annular detent.

15. The additive pump of claim 1, further comprising:
    apertures in each of the adapter and the annular detent on the sealing collar.

16. The additive pump of claim 9, further comprising:
    apertures in the adapter that align with apertures in the annular detent on the sealing collar.

* * * * *